No. 880,274. PATENTED FEB. 25, 1908.
C. A. BROPHY.
COVER FOR PNEUMATIC TIRES.
APPLICATION FILED OCT. 20, 1906.
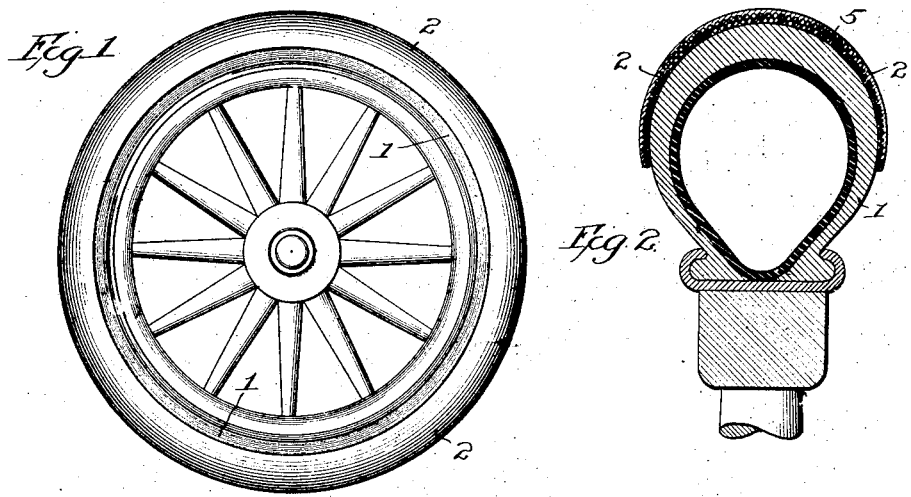
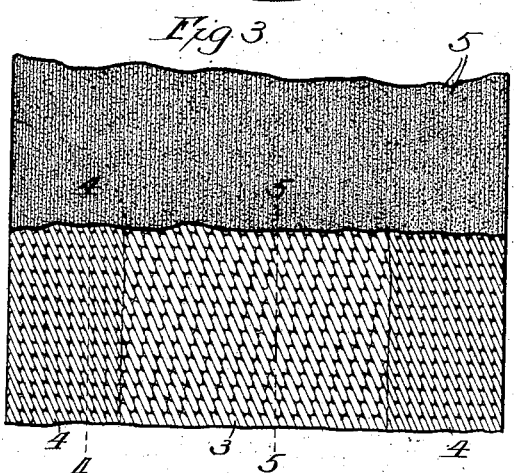
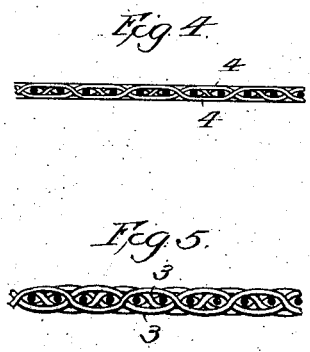
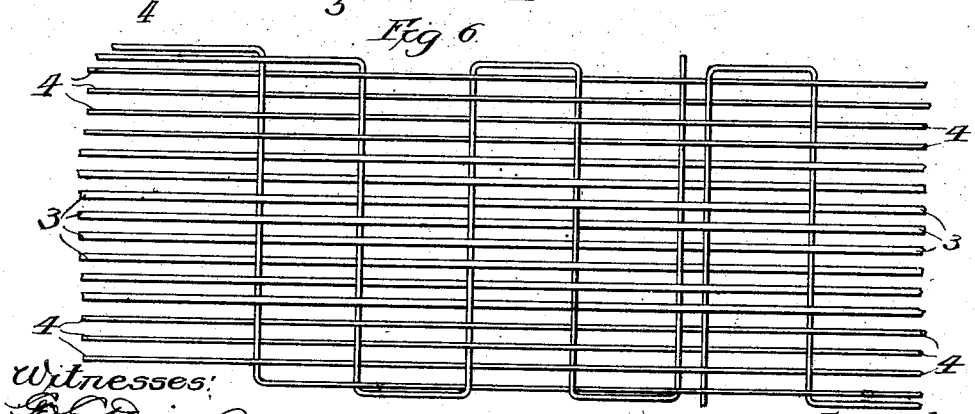
Witnesses:
Inventor:
Charles A. Brophy,
By Barton, Tanner & Folk,
Att'ys

UNITED STATES PATENT OFFICE.

CHARLES A. BROPHY, OF HINSDALE, ILLINOIS.

COVER FOR PNEUMATIC TIRES.

No. 880,274.    Specification of Letters Patent.    Patented Feb. 25, 1908.

Application filed October 20, 1906. Serial No. 339,748.

*To all whom it may concern:*

Be it known that I, CHARLES A. BROPHY, citizen of the United States, residing at Hinsdale, in the county of Dupage and State of Illinois, have invented a certain new and useful Improvement in Covers for Pneumatic Tires, of which the following is a full, clear, concise, and exact description.

My invention relates to a cover for pneumatic tires, and its objects are to provide an endless cover or shield which is of simple construction and easily and cheaply manufactured, which is flexible and exceedingly durable, which may be readily and quickly placed upon or removed from the wheel, which will thoroughly protect the wearing face that it covers, which by the mere inflation of the pneumatic tire will be securely and reliably held in place thereon, free from "creeping" action, and which will provide a tread surface of increased efficiency on ordinary roads, as well as prevent or decrease the slipping of the wheels during a sharp turn or upon wet or slippery roads.

With the above objects in view, my invention contemplates a flat endless belt or cover, the middle portion of which is more loosely woven than the sides thereof, so that when the cover is placed in position upon a deflated tire, and the tire then inflated, the cover will lose its flat shape and assume that of the outer periphery of the pneumatic tire. The middle portion being loose will stretch more than the tightly woven sides of the belt or cover and said belt will become concavo-convex in cross section, snugly fitting the inflated tire. The inflated tire and the threads of the textile cover will become so embedded in each other as will effectively prevent any creeping of the cover on the tire.

I preferably make the tread portion of the belt or cover of increased thickness, thereby increasing the durability of the same. This increased thickness results from that feature of my invention which consists in the use of warp threads of larger size at the middle than at the sides of the belt.

A further feature of my invention consists of means by which the tread of the cover is rendered non-slippable, said means at the same time adding greatly to the durability of the cover.

These and other features of my invention may be more readily understood by reference to the accompanying drawings, in which, Figure 1 is a side elevation of an automobile wheel, the tire of which is provided with the cover constituting my invention: Fig. 2 is an enlarged cross section of the tire and cover shown in Fig. 1; Fig. 3 is a fragmentary plan view of the belt or cover, with parts broken away: Figs. 4 and 5 are sections on the lines 4—4 and 5—5 respectively, of Fig. 3; and Fig. 6 is a diagrammatic view illustrating the manner of forming the belt or cover.

Similar reference letters indicate the same parts wherever they are shown.

The pneumatic tire 1 and the wheel of the automobile or other vehicle of which it is a part may be of the usual construction. Such tires are as a rule made of standard sizes, and hence my endless belt or cover 2 may also be made of standard sizes, adapted to fit over corresponding tires.

It will be understood that the endless belt 2 is formed from continuous strands 4, 3, 4, formed into parallel longitudinal loops of a length corresponding approximately to the periphery of the tire which it is designed to cover, the ends of the outer convolution being woven transversely back and forth between the intermediate convolutions in the manner of a weft. This method of forming an endless flat belt is described in United States Letters Patent to Anthon Christensen No. 606,376, dated June 28, 1898, and need not be further set forth. However, in my invention, the cords 3 forming the warp threads of the middle portion of the belt are not drawn so tightly as the threads 4 forming the warp threads at the sides of the belt. As a result the middle portion of the belt will be woven more loosely and hence will be more elastic than the side portions thereof.

While I have found that a belt woven as above described possesses the required flexibility, and is exceedingly durable, I do not wish to limit my invention to any particular manner of forming the belt so that the middle part of it is capable of stretching to a greater degree than the sides thereof.

The flat endless belt made in the manner above described may be readily passed over the deflated tire which it is designed to cover. Upon the inflation of the tire greater pressure will be exerted upon the middle portion of the belt, which portion becomes stretched in a manner readily apparent. The side portions of the belt being non-stretchable, said belt will lose its flat shape and will assume that corresponding to the outer periphery of the tire, snugly fitting the same, as clearly shown in Fig. 2. It will be seen, therefore, that my cover or shield 2 of itself assumes a shape to snugly fit the convex surface of the tire tread and need not be previously rendered concavo-convex in cross-section.

The cover 2 being preferably formed of coarse threads or cords will present a rough surface, so that the material of the tire will more or less embed itself in the interstices of the fabric, and the cords will likewise embed themselves in the rubber tire, thereby effectively preventing the cover from "creeping" on the tire.

The cords 3 at the middle of the belt are preferably coarser or thicker than the cords 4 at each side. This structure provides a cover having a thickened tread portion formed in a simple manner. I am aware that the desirability of such thickened tread portion has been recognized, but, so far as I am aware, such end has been attained only by making the cover of two or more thicknesses at this portion or by other structures less simple than that of my invention. I am also aware that belts have been woven with the threads at the sides thereof thicker than those at the middle, in order to produce a belt of concavo-convex cross-section. So far as I am informed, however, I am first to produce a belt or cover having such desirable shape and at the same time having the coarser threads in the middle portion of the belt.

In order to increase the durability of the belt and at the same time produce a more efficient tread surface, I preferably coat the outer surface of the belt or cover 2 with sand or similar friction producing material, as indicated at 5. Any suitable adhesive for applying the sand to the surface of the belt may be employed. Such adhesive should be impervious to water. Plastic rubber compound mixed with sand or other equivalent friction producing material will meet my requirements, and may be placed upon the surface of the belt and allowed to soak therein. The mixture may then be set or vulcanized in any well known manner. Such a coating will, as before stated, add greatly to the durability of the cover. Moreover the sanded surface of the belt presented to the road provides a smooth running tread having a perfect gripping surface. Such a surface will also have sufficient friction with the road to prevent or at least markedly lessen the slipping which is common where the ordinary tire is employed.

While I have shown the tire cover of my invention applied as an outer covering of a pneumatic tire, I do not limit myself to such particular use of my invention, since other analogous uses will readily suggest themselves to one skilled in the art.

Having described my invention I claim:

1. In a cover for pneumatic tires, an endless flat belt of textile material, having the warp threads in the middle portion thereof drawn less tightly than the warp threads at the sides thereof, said belt being thereby adapted to be stretched, by the inflation of a pneumatic tire upon which it is placed, into assuming a shape corresponding to the periphery of that portion of the pneumatic tire which it covers.

2. In a cover for pneumatic tires, an endless flat belt of textile material having the warp threads formed into parallel longitudinal loops, each corresponding approximately in length to the circumference of that portion of the tire which it is designed to surround, and having the warp threads in the middle drawn less tightly than the warp threads at the sides of the belt, said belt being thereby adapted to be stretched, by the inflation of a pneumatic tire upon which it is placed, into assuming a shape corresponding to the periphery of that portion of the pneumatic tire which it covers.

In witness whereof, I, hereunto subscribe my name this 18th day of October A. D., 1906.

CHARLES A. BROPHY.

Witnesses:
 GEORGE E. FOLK,
 ALFRED H. MOORE.